(12) United States Patent
Waller

(10) Patent No.: US 8,725,139 B2
(45) Date of Patent: May 13, 2014

(54) METHOD AND SYSTEM TO ENABLE MULTIPLE VIRTUAL NUMBERS ACROSS DIFFERENT MOBILE NETWORKS

(75) Inventor: Nigel Waller, London (GB)

(73) Assignee: Movirtu Limited, London (GB)

( * ) Notice: Subject to any disclaimer, the term of this patent is extended or adjusted under 35 U.S.C. 154(b) by 367 days.

(21) Appl. No.: 12/555,648

(22) Filed: Sep. 8, 2009

(65) Prior Publication Data

US 2011/0059738 A1  Mar. 10, 2011

(51) Int. Cl.
*H04W 4/00*  (2009.01)

(52) U.S. Cl.
USPC ........................................ 455/433; 455/432.1

(58) Field of Classification Search
USPC ........... 455/432.1–432.3, 433–442, 461, 560, 455/561, 415, 435.1, 435.2
See application file for complete search history.

(56) References Cited

U.S. PATENT DOCUMENTS

| | | | |
|---|---|---|---|
| 6,167,264 A * | 12/2000 | Palviainen et al. | 455/433 |
| 7,218,915 B2 * | 5/2007 | Craven | 455/411 |
| 2004/0142684 A1 * | 7/2004 | Ratert et al. | 455/420 |
| 2006/0205404 A1 * | 9/2006 | Gonen et al. | 455/432.1 |
| 2009/0227229 A1 | 9/2009 | Waller | |
| 2009/0318113 A1 | 12/2009 | Waller | |
| 2010/0291924 A1 * | 11/2010 | Antrim et al. | 455/433 |

\* cited by examiner

*Primary Examiner* — San Htun
(74) *Attorney, Agent, or Firm* — Steptoe & Johnson LLP

(57) ABSTRACT

Disclosed is a system and method for enabling a subscriber who has multiple virtual or physical SIM identities across several networks to make and receive calls and messages on a single handset at the same time. Key features of the disclosure is the setup and management of multiple virtual IMSIs and MSISDNs, from different networks, or from the same network but different countries or regions, which exist in one or more servers which are able to manage inbound and outbound calls and messages enabling a subscriber to manage multiple identities without the need to swap or replace SIM cards.

7 Claims, 2 Drawing Sheets

Visited Mobile Network                              Home Mobile Network

METHOD AND SYSTEM TO ENABLE MULTIPLE VIRTUAL NUMBERS ACROSS DIFFERENT MOBILE NETWORKS

CROSS-REFERENCE TO RELATED APPLICATIONS

This application claims the benefit of application Ser. No. 12/214,902, Method and System for Enabling Personalized Shared Mobile Phone Usage, Application Filed Mar. 4, 2008 by the present inventor, which is incorporated by reference, and is a continuation in part of that Application.

STATEMENT REGARDING FEDERALLY SPONSORED RESEARCH OR DEVELOPMENT

Not Applicable.

US PATENT DOCUMENTS REFERENCED

U.S. Pat. No. 5,657,373, Digital Mobile Telephone System in which each Subscriber is Assigned a Telephone Number and Several Subscriber Identity Module (SIM) Cards, Hermansson et al., Assignee Europolitan AB, Date of patent Aug. 12, 1997

U.S. Pat. No. 5,764,730, Radiotelephone Having a Plurality of Subscriber Identities and Method for Operating the Same, Rabe et al, Assignee Motorola, Date of patent Jun. 9, 1998

U.S. Pat. No. 6,212,372 B1, Method in Mobile Telephone Systems in which a Subscriber Identity Module (SIM) is Allocated at Least Two Identities which are Selectively Activated by the User, Julin, Assignee Comvik GSM AB, Date of patent Apr. 3, 2001

U.S. Pat. No. 6,603,968 B2, Roaming in Wireless Networks with Dynamic Modification of Subscriber Identification, Anvekar et al., Assignee Level Z, L.L.C., Date of patent Aug. 5, 2003

U.S. Pat. No. 6,978,156 B1, Mobile Radio Telephone System having an Identity which can be Dynamically Changed, Papadopoulos et al., Assignee Giesecke & Devrient GmbH, Date of patent Dec. 20, 2005

US 2007/0105531 A1, Dynamic Processing of Virtual Identities for Mobile Communication Devices, Schroeder Jr, Application Published May 10, 2007

US 2007/0213050 A1, Method and System for Keeping all Phone Numbers Active while Roaming with Diverse Operator Subscriber Identity Modules, Yue Jun Jiang, Assignee Roamware, Inc., Application Published Sep. 13, 2007

BACKGROUND OF THE INVENTION

The present invention relates generally to mobile telephony communications; and more specifically to the ability to store in the network a catalogue of multiple identities from several networks owned by the same person which can be accessed from any mobile phone on any of the networks.

The use of a Subscriber Identity Module (SIM) which is an active card plugged into a Mobile Station (MS) with a unique identity called the International Mobile Equipment Entity (IMEI) which is allocated a unique directory number called the Mobile Station International ISDN number (MSISDN) is well documented is 3GPP/ETSI GSM specifications such as 3GPP/ETSI GSM 02.17 (SIM-Functional Characteristics) and 3GPP/ETSI GSM 02.16 (International Mobile Station Equipment Identities (IMEI)). The paring of the IMSI and MSISDN is stored together with other information relating to the subscriber in the Home Location Register (HLR) which is located in the home network of the subscriber. The system comprises Visitor Location Register (VLR) and Mobile Switching Centre (MSC). Information of active visitor MSs is stored in the VLR.

In this scenario the mobile number of the user is fixed to the MS. This has the disadvantage that if multiple people use the same phone, or if the user has several mobile phone numbers, either on the same network or across several networks and countries, they cannot co-exist on the same MS at the same time.

Users can swap their identities by changing the SIM card in the MS, a process which involves removing the case of the MS and battery, physically swapping the SIM cards and replacing the battery and case. In this scenario only one identity is active, and the original SIM card is off network. Any voice calls made to the original MSISDN will be either sent to voicemail, or the dialling party will hear a message indicating that the subscriber is not available depending on the subscriber's settings. All messages including Short Message Service (SMS) will be stored in the appropriate message centre such as the Short Message Service Centre (SMSC) and will be delivered on the original SIM is re-activated on the network.

In US patent U.S. Pat. No. 6,212,372 B1 Julin provided a method and apparatus to provide at least two identities on each SIM card on the MS. The identity could be swapped either by the subscriber physically altering the SIM card, for example by reinserting the SIM card upside down, or by an application installed on the MS.

In US Patent Application US 2007/0213050 A1 Jiang provided a method and apparatus to provide multiple identities across several networks, however the subscriber has to carry a special SIM card with a SIM Tool-Kit (STK) application which enables the SIM to carry multiple IMSIs and causes the handset to register with an alternative local MSISDNs.

In the inventors application Ser. No. 12/214,902, Method and System for Enabling Personalised Shared Mobile Phone Usage, Application Filed Mar. 4, 2008, a method and system to enable a user to used any shared MS in the network and access a virtual account to make and receive voice calls and SMSs was described. This approach transforms the MS into a thin client which accesses a virtual identity stored in a system server (called MXShare) acting as an HLR on the network. The virtual identity comprised an MSISDN and virtual IMSI stored on the MXShare server and the system allows calls to be made and received on the shared MS. This system has the restriction that using Unstructured Supplementary Service Data (USSD) as the communication channel for the thin client; the MS and virtual IMSI have to be registered on the same mobile network to be fully functional. This is because any USSD commands sent from the MS to activate and control the virtual identity are sent to the home network of the MS/SIM combination for interpretation, in this case the output being that the commands entered into the USSD strings are dispatched to MXShare for interpretation and action.

In the preferred embodiment of the system described previously, mobile operators can service people who cannot afford a phone, or do not wish to purchase a phone, and still allow them to have a fully functioning pre-paid account which they access using other people's phones, or street side mobile pay phones. In alternative embodiments it can be used to service people who already have a handset, and a mobile phone number, but require virtual access to their account from another phone, or where a user has multiple phone numbers on the same network and wishes to use them from one specific handset.

Many people may own separate SIMs for different networks within a country, in order to use the best available tariff when making a specific outbound call. When people travel between countries they may own SIMs across multiple countries. The issues described previously still exist and are made more difficult when dealing with different countries. For example a subscriber may not be able to access any service on a particular SIM at all in the different country if no roaming agreements exists, and if they have not forwarded their phone before leaving they may not be able to receive any calls until they return to that country. If a subscriber does not use a particular prepaid account and SIM for any length of time, typically 3 months, the number may be recycled and given to a new subscriber and the user will lose any airtime credit they may have.

Thus there is a need to be able to manage different identities across different networks without the hassle of removing the SIM card, whilst ensuring that the identities are active at the same time. Prior art has shown how this can be done using a special SIM card, however the present application shows how this can be done without the need to change the SIM card.

BRIEF SUMMARY OF THE INVENTION

The method and system to enable multiple virtual numbers across networks disclosed herein is an innovative network application, enabling subscribers who have multiple numbers across different networks to make and receive calls, SMSs and use other services such as money transfer without having to change their SIM card.

In the first embodiment the subscriber owns SIMs from the same operator across different countries, and hence the subscriber has several MSISDNs, one in each country. The operator will have installed system servers (MXShare) in each country that it operates. The subscriber places one of his SIM cards in a phone and the combination of the IMSI, MSISDN and IMEI are stored in the home system server (MXShare). The other accounts that are owned by the subscriber are stored in their retrospective system servers (also MXShare servers) in their own host countries. The MXShare servers are connected together using a network connection.

When the subscriber travels to a different country, the VLR recognizes that the subscriber is roaming and it interrogates the home HLR which knows that the subscriber has multiple accounts and activates the account stored in the MXShare in the roaming country. MXShare allows inbound calls from the local number to be routed the subscriber's handset, including presentation of calling party's Calling Line Identity ("CLI"). Out bound calls are made using the subscriber's home SIM, however MXShare may optionally change the CLI of the outbound call to show a local number as default. In addition, the subscriber may by sending a USSD, or SMS command to the system swap their identity for out bound calls or SMSs, thus allowing a call to be made whilst roaming, but using the home and not the local identity. It is up to the operator to decide how they wish to charge for these services and it may be that the operator decides not to charge roaming charges.

This invention has the benefit of the prior art that the subscriber does not need to change their SIM card. In addition, the operator could offer virtual numbers to the roaming subscriber which could be purchased in real time upon travelling to the country. The subscriber would receive a "Welcome SMS" offering the subscriber to purchase a local number. The local number would exist on the local MXShare server and would be linked to the subscriber's home account.

In this way the operator could sell virtual numbers over the air without the need for the subscriber to change their SIM card, or visit a local dealer.

In an alternative embodiment several network operators in the same country may have MXShare servers installed in their network and each of the servers would be linked by a network connection. Thus a subscriber could have multiple numbers in the same country. In practise the mobile operators are fiercely competitive and this is unlikely to happen, however where a Mobile Virtual Network Operator (MVNO) has set up a virtual operation in a particular country on the back of a particular network, the MVNO is more likely to be able to negotiated access to the other networks and set up a system whereby either subscribers choose the network they would like to use to make outbound calls, or the system automatically selects the best network on price, or on another variable. As described in the previous embodiment all inbound calls and messages would be routed to the same active SIM in the handset.

In the previous two embodiments, servers are required to be installed in each network and country of operation. In the third embodiment, an operator has installed a single MXShare server in a single country. The server is connected by a network connection to a remote server sitting outside the operator's network. This remote server may be connected to a VoIP, fixed line or other mobile network in any country wherever the subscriber holds identities. The server will hold a database of the multiple identities and their associated passwords. The company owning the server would procure identities from other VoIP, fixed line or other mobile providers and would store these identities on the server. Inbound calls from any of the networks are routed to the mobile number. The user has the option to change his CLI for outbound calls or messages to any one of the other identities they may hold. In such an implementation, the subscriber, if allowed by the operator, could choose to make outbound calls using any one of the alternative networks at a tariff rate to be agreed between the operator and that provider. The operator would still be in control of setting tariffs as the operator could decide at any time to discontinue its relationship with one of the other providers that the server is connected to. This embodiment would have the advantage that In all these embodiments, the MXShare server can also be programmed to manage the account balance of the various account to ensure that no accounts are stopped or recycled due to inactivity. In all these embodiments additional functionality can be added to the server including a cross-network, cross-country address book, a single voicemail and a single missed call alert account.

In the above examples the owner of the SIM does not necessarily have to own a SIM at all. The subscriber can borrow or share phones to access their accounts. As described in application Ser. No. 12/214,902, Method and System for Enabling Personalised Shared Mobile Phone Usage, filed by the inventor on Mar. 4, 2008 if an MXShare server is installed in the network on which the subscriber wishes to borrow a phone, then that phone can blocked from making any outgoing calls or messages by send a message to the IN to disable billable features and the subscribe can borrow that phone to access his account and make and receive calls and messages on the shared phone.

While the foregoing describes what are considered to be the preferred embodiments of the invention, it is understood that various modifications may be made therein and that the invention may be implemented in various forms and alternate embodiments, and indeed that it may be applied in numerous applications, only some of which have been described. The claims are intended to cover all such modifications and variations which fall within the true scope of the invention. The bona fide distinctiveness of the invention resides in the setup and management of multiple virtual IMSIs and MSISDNs, from different networks, or from the same network but different countries or regions, which exist in one or more servers which are able to manage inbound and outbound calls and messages. Subscribers access the server from a mobile phone or other device.

BRIEF DESCRIPTION OF THE DRAWINGS

The foregoing summary of the invention, as well as the following detailed description of the preferred embodiment, is better understood when read in conjunction with the accompanying drawings, which are included by way of example and not by way of limitation with regard to the claimed invention:

DETAILED DESCRIPTION OF THE PRESENTLY PREFERRED EMBODIMENT

Figure 1:
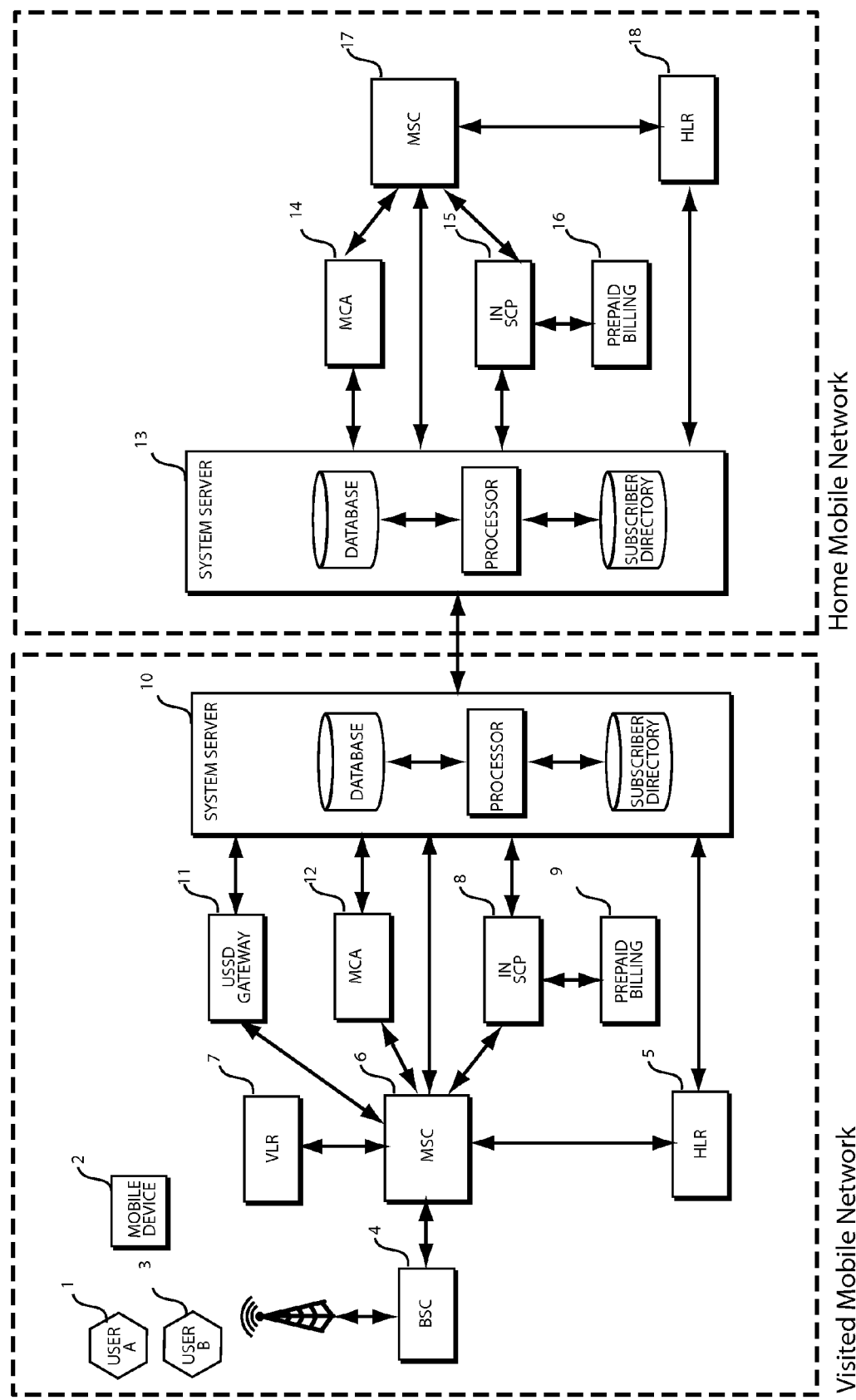
FIG. 1. is an exemplary architecture of two wireless telecommunication networks, each with a system server in accordance with the present invention.

In FIG. 1. User A 1 owns Mobile Device 2 and inside the mobile device is a personal SIM (Subscriber Identity Module) Card supplied by the network operator. The SIM card uniquely identifies the subscriber using an IMSI (International Mobile Subscriber Identity) and their mobile phone number the MSISDN (Mobile subscribers integrated services digital network) and allows the Mobile Device 2 to be registered and authenticated on the Home Mobile Network. The Mobile Device 2 itself is identified by an IMEI (International Mobile Equipment Identity), which can be obtained by the network upon request. Telephony calls, and other services used by the device, are billed to the account holder of the SIM Card. Base Station Controller (BSC) 4 is the network element which provides all the control functions and physical links between the network and the radio interface. The BSC provides functions such as handover, cell configuration data, and control of radio frequency power levels.

The Home Location Register (HLR) 18 is a database which stores data about the subscribers, including the Authentication Key (Ki) for each SIM. The Mobile Services Switching Center (MSC) 17 is the network element which performs the telephony switching functions of the network. The MSC is responsible for network interfacing and common channel signalling.

The subscriber User A in FIG. 1. has registered for the service enabled by the server described herein. The subscribers' record instead of being stored in the HLR 18 is stored in the System Server 13 which is acting as an HLR in the Home Mobile Network.

Figure 2:
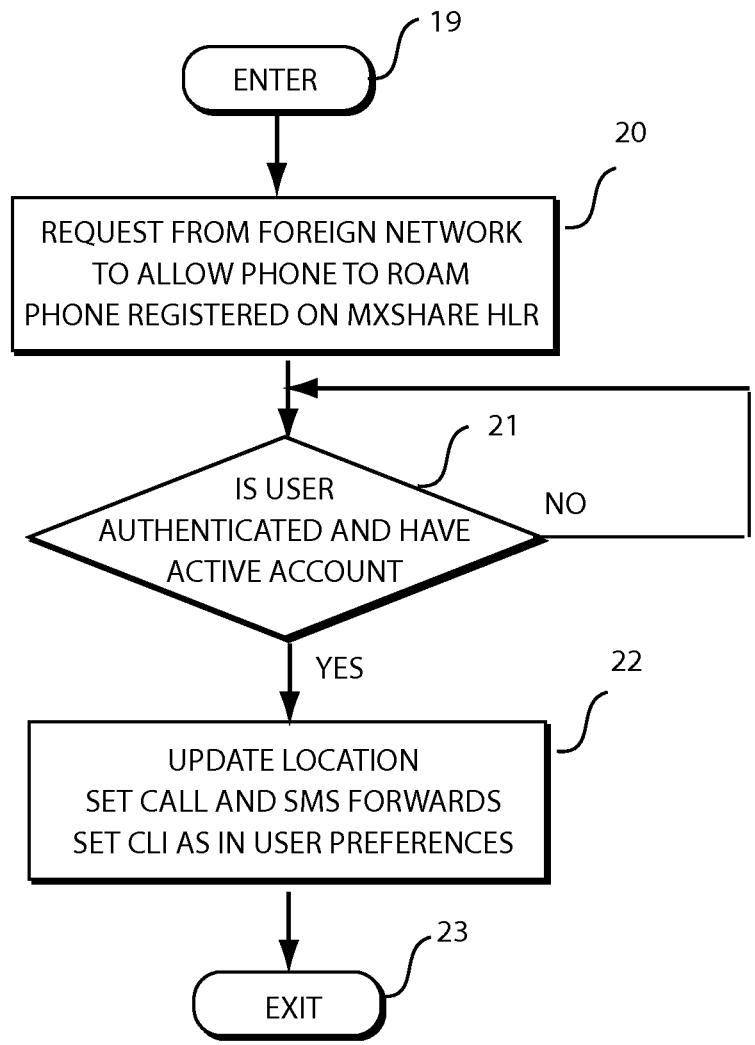
FIG. 2. Is a flowchart depicting the operation of the roaming feature according to one embodiment of the present invention.

When the subscriber roams to the foreign network, the Visited Mobile Network, the system recognises that his MSISDN belongs to the Home Mobile Network and the home network is interrogated according to the flowchart in FIG. 2. The System Server in the Visited Mobile Network, and the MSC in the Home Mobile Network 17, are configured appropriately according to the subscriber's preferences for CLI and call and SMS forwarding. The Visited Mobile Network System Server will store the HLR details for the subscriber in the foreign network.

When the subscriber makes an outgoing call the System Server 10 will have set the CLI as either set in the subscriber's default preferences (to show Visited CLI or Home CLI) or as manually set by the subscriber by sending an instruction to the System Server 10 by USSD, SMS or other means. Any calls or messages will be rated according the tariff plan set for the service by the operator and billed to the Home Mobile Network billing account.

When the subscriber receives an incoming call or message on either MSISDN, these are router to the Visited Mobile Network and onto the handset.

While the foregoing describes what are considered to be the preferred embodiments of the invention, it is understood that various modifications may be made therein and that the invention may be implemented in various forms and alternate embodiments, and indeed that it may be applied in numerous applications, only some of which have been described. The claims are intended to cover all such modifications and variations which fall within the true scope of the invention.

The invention claimed is:

1. A method for enabling a subscriber having multiple accounts with multiple network providers to obtain the lowest price for an outbound call, the method comprising:
   receiving a request from a subscriber to make an outbound call, wherein the request is received at a system server of a Mobile Virtual Network Operator (MVNO) from a mobile station associated with a Mobile Station Integrated Services Digital Network (MSISDN), wherein the system server is connected to at least two network operators located in the same country;
   determining which network operator will provide the lowest price for the outbound call;
   assigning a virtual MSISDN to the outbound call by the system server, wherein the virtual MSISDN is associated with an account of the network operator providing the lowest price;
   routing the outbound call through the network operator providing the lowest price;
   receiving a first request at the system server to enter a shared mode, wherein the first request is received from the mobile station comprising a Subscriber Identity Module (SIM), wherein the SIM is associated with a first subscriber; wherein the first request is received prior to the request from the subscriber to make an outbound call;
   transmitting a second request for an access string from the wireless telecommunications network to the mobile station;
   receiving and authenticating the access string at the system server, wherein the access string is associated with a second subscriber; and
   enabling billing to the second subscriber for charges incurred by usage of the mobile station while in the shared mode and while using the SIM associated with the first subscriber.

2. The method of claim 1, wherein the system server automatically selects the network operator providing the lowest price.

3. The method of claim 1, wherein a subscriber manually selects the network operator providing the lowest price using the mobile station.

4. The method of claim 1, further comprising sending an offer from the system server to the mobile station, the offer allowing the subscriber to purchase a new virtual MSISDN from any of the at least two network providers with whom the subscriber does not have an existing account.

5. The method of claim 4, further comprising purchasing the new virtual MSISDN in real time.

6. The method of claim 4, further comprising sending the offer as a SMS message.

7. The method of claim 4, further comprising managing the account balances of the various accounts to ensure that none of the accounts are stopped or recycled due to inactivity.

\* \* \* \* \*